United States Patent [19]
Kay et al.
[11] 3,808,456
[45] Apr. 30, 1974

[54] REMOTE CONTROL SWITCHING SYSTEM

[75] Inventors: Andrew F. Kay, Del Mar; Sam Messin, Solana Beach, both of Calif.
[73] Assignee: Switchpack Systems, Inc., Del Mar, Calif.

[22] Filed: Jan. 18, 1973
[21] Appl. No.: 324,574

Related U.S. Application Data
[63] Continuation-in-part of Ser. No. 183,842, Sept. 27, 1971, Pat. No. 3,761,738.

[52] U.S. Cl. ........ 307/140, 174/117 A, 317/148.5 B
[51] Int. Cl. .............................................. H01h 47/32
[58] Field of Search .................. 317/101 F, 148.5 B; 307/112, 106, 140; 200/156, 159, 166 BH; 174/117 A, 53

[56] References Cited
UNITED STATES PATENTS

| | | | |
|---|---|---|---|
| 3,527,957 | 9/1970 | Eck | 307/140 |
| 3,522,486 | 8/1970 | Johns et al. | 307/101 F |
| 2,749,382 | 6/1956 | Lockard | 174/117 A |
| 2,324,844 | 7/1943 | Hutt | 307/112 OR |
| 1,696,151 | 12/1928 | Staedeli | 200/159 A |
| 3,359,515 | 12/1967 | Thatcher | 200/166 BH |
| 3,524,921 | 8/1970 | Wolf | 174/117 A |
| 3,472,945 | 10/1969 | Trachtenberg | 174/53 |

*Primary Examiner*—Robert K. Schaefer
*Assistant Examiner*—M. Ginsburg
*Attorney, Agent, or Firm*—Edgar H. Kent

[57] ABSTRACT

A remote control switching system has an electromechanical switch operated by low voltage electronic switching circuitry to alternately connect and disconnect a load across high voltage conductors. The components of the electronic switching circuitry are in miniature and that circuitry and the electromechanical switch are of such small size that they can be housed together in a casing which will fit in an ordinary wall box. Flat thin wall-surface-mountable conductors are provided for operatively connecting the low voltage switching circuitry to wall-surface-mountable pushbutton switches, such switches and electric connectors of special construction being also provided.

20 Claims, 8 Drawing Figures

PATENTED APR 30 1974 3,808,456

SHEET 2 OF 3

REMOTE CONTROL SWITCHING SYSTEM

CROSS-REFERENCE TO RELATED APPLICATIONS

This application is a continuation-in-part of our application Ser. No. 183,842, filed Sept, 27, 1971, now U.S. Pat. No. 3,761,738. Reference is also made herein to application Ser. No. 183,877, filed by William Paul, Sept. 27, 1971, now U.S. Pat. No. 3,739,308, and to application Ser. No. 252,873, now abandoned, filed by applicant Andrew F. Kay herein on May 12, 1972.

BACKGROUND OF THE INVENTION

1. Field of the Invention

This invention relates to a remote control switching system and to circuits and components thereof.

2. Description of the Prior Art

Prior to the inventions set forth in the patent applications above referred to and this invention there has existed, to our knowledge, no remote control switching system which did or could utilize wall surface mounted control switches, flat thin conductors, which can be surface-adhered to a wall and concealed by paint or wallpaper, connecting the control switches to a low voltage electronic switching circuit, and an electro-mechanical switch operated by the switching circuit to open and close a relatively high voltage circuit, both the electro-mechanical switch and the switching circuit being of dimensions small enough to fit within an outlet box of ordinary size. Such a surface and wall box mountable system is obviously desirable over the conventional prior systems using embedded wiring, partially embedded complex wall switches and/or special controls and housings therefor requiring in-wall installation.

SUMMARY OF THE INVENTION

It is a general object of the present invention to provide such a system which can be inexpensively made and installed and which meets Underwriters' safety standards.

Another object is to provide such a system which utilizes an electronic switching circuitry which is an improvement in certain respects over such circuitry disclosed in our aforesaid application.

Another object is to provide such a system wherein the electro-mechanical switch and the electronic control circuitry therefor are housed in a single casing of insulation material having external dimensions such that it will readily fit within a conventional wall outlet box.

A further object is to provide in such a system miniaturized electronic control circuitry all the parts of which can be mounted and connected in a part of the space within the aforesaid casing.

A still further object is to provide in such a system a pushbutton control switch, adapted for surface mounting on a wall, which is simple and inexpensive to make and easy to install.

The invention features, in preferred embodiments, a remote control switching system wherein the connections between control and controlled switches are flat, thin conductors which are wall-surface mounted and may be fastened thereto by adhesive provided thereon, as in application Ser. No. 252,873, aforesaid. The voltage in the circuit from the control switches is extremely low, e.g., less than 5 volts, and the conductors, together with their encasing dielectric, which may be plastic film, are so thin, e.g., 0.007 inch or less, that they may be concealed behind wallpaper or paint. The control switches are flat plates for wall surface mounting and they too may be backed with adhesive for the purpose or can be provided with fastening screws. They have a short central protruding wall defining a switch cavity closed by a pushbutton under which is a spring, and terminals closed by depression of the button, which are connected to the flat conductors extending into the switch cavity between the wall and the switch plate. As many of these surface-mounted switches and flat conductors as desired may branch from a single connection to the electronic circuit controlling the electro-mechanical switch.

To simplify the making of electrical connections, special terminals are provided in the form of screws and washers having teeth sharp enough to bite through the plastic covering of the flat wires to make electrical contact between the screws and the wire. Parts to be connected to the wires are provided with threaded sockets to receive the terminal screws, positioned so that when the screws are tightened in the sockets, the teeth of the washer associated with each screw will make electrical contact with one of the wires.

The electronic switching circuitry and the electro-mechanical switch are housed in a single casing of insulation material having an internal cavity of dimensions about 2½ inches long by 1½ inches wide by three-fourths inch deep. The switch and circuitry are mounted at opposite sides of an insulation barrier which, when the cover of the casing is in place, forms the casing into two separate compartments insulating the electronic switching circuitry from the electro-mechanical switch. With such internal dimensions the casing may be provided with the usual end mounting lugs and will fit and may be mounted in the conventional wall box.

The electro-mechanical switch is compact and designed to be operated to switch the main, high voltage circuit between on and off states by a single pulse of extremely short duration, e.g., about one-half cycle of a 60 cycle per second alternating current. Preferably it is a ratchet type solenoid switch of a construction shown and described in patent application Ser. No. 183,877 aforesaid. The electronic switching circuitry is of a type disclosed in our aforesaid patent application which, upon depression of a control switch pushbutton, triggers on a switch in circuit from the main source which latter switch cuts off and remains off after half an AC cycle regardless of how long the pushbutton switch remains closed. Preferably, this circuit is the modified circuit disclosed in this application and utilizes components capable of being miniaturized, mounted and connected on a card of dimensions to fit within the portion of the aforesaid casing at one side of its insulating barrier.

The components of the system are not expensive to manufacture and the system can be utilized with substantial savings as well as other advantages over in-wall switching systems.

DESCRIPTION OF THE PREFERRED EMBODIMENT

Figures 1, 2A:
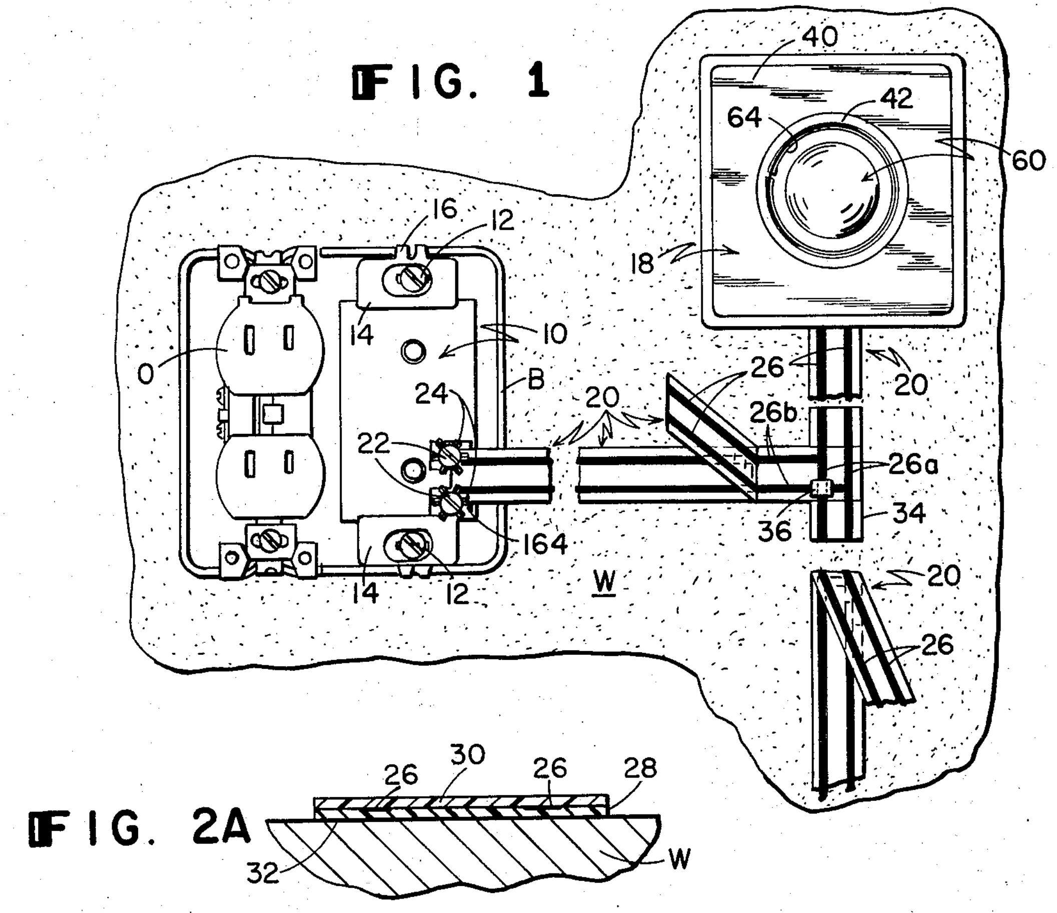
FIG. 1 is a plan view of part of a system according to the invention on a wall with conductors broken away in part and with the cover of the outlet box removed.
FIG. 2A is an enlarged cross-section view through one form of flat thin conductors that may be used and FIG. 2B is a similar view of another form of such conductors.
Figure 3:
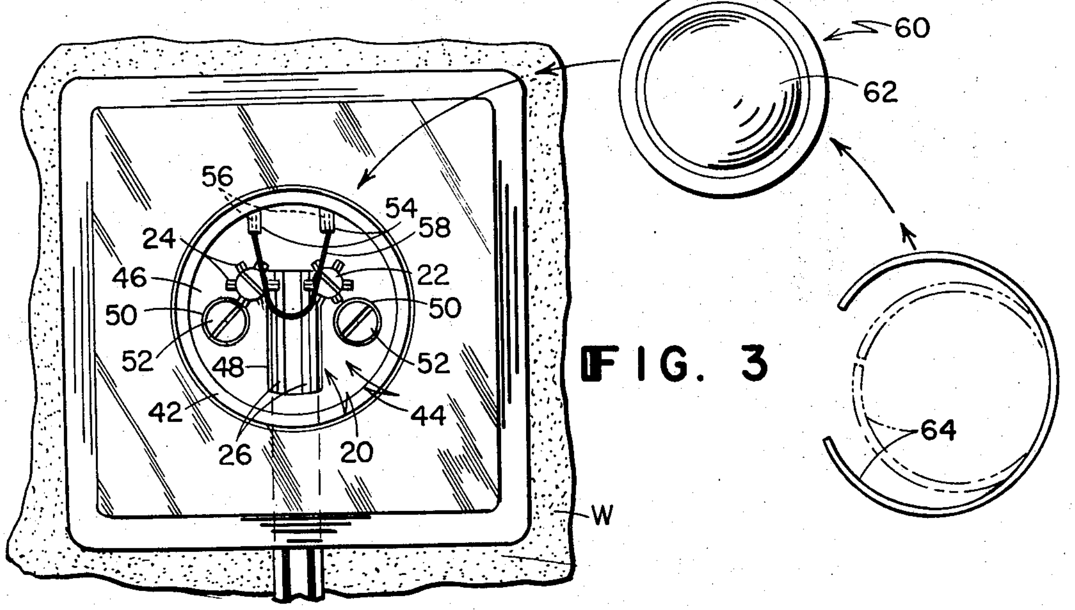
FIG. 3 is a plan view of the control switch of FIG. 1 with the pushbutton and retaining ring removed therefrom also shown in exploded plan.

FIG. 1 shows a system according to the invention used to control a two socket outlet O mounted in one side of a conventional standard two-gang outlet box B inset in a wall W so that its open end (cover removed) is flush with the wall surface. Outlet O is controlled by a combined electronic switching and electro-mechanical switch unit designated generally 10, mounted in the other side of outlet box B by screws 12 passing through openings in end lugs 14 on unit 10 and received in threaded socket members 16 provided on the end of the box. Unit 10 is operated from a remote control wall-surface mounted push button switch designated generally 18, or selectively from one or more additional such switches (not shown) by thin, flat insulated conductor strip material designated generally 20. Material 20 is adhered to the surface of wall W and is electrically connected by terminal screws 22 and contact washers 24 to unit 10 (FIG. 1) and switch or switches 18 (FIG. 3).

Figure 2B:
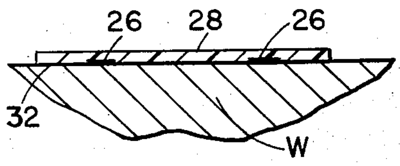

Two specifically different forms of thin, flat conductor material 20 that may be used in the system are shown in FIGS. 2A and 2B respectively on an enlarged scale. Each form has two extremely thin, laterally spaced conductor strips 26 formed or printed on one face of a thin insulating film 28 of plastic. The form of FIG. 2A has a second insulating film 30 of plastic adhered to the conductor-carrying face of film 28 so that the conductors are embedded between the two films, and film 28 is provided with a layer of adhesive 32 on its outer face by which the strip material is adhered to wall W. The form of FIG. 2B differs in that the film 30 of FIG. 2A is omitted, the adhesive 32 being applied over the conductor-carrying face of film 28 and constituting the only insulation between the wires and the wall. The form of FIG. 2B has the advantage of being slightly thinner but the form of FIG. 2A is normally used on walls that are exposed to moisture or on which moisture condenses such as concrete. Film 30 may be stripped off film 28 and contacts 26 as desired for making connections. Films 28 and 30 are usually transparent so that the conductors are visible therethrough as indicated in the drawings.

Strip material 20 may be folded on itself for turns or right-angle bends. For making branch connections, a special T-shaped section 34 may be provided which, as shown in FIG. 1 may be adhered to the wall at the desired location of the branch. (In FIG. 1 the ends of conductor strip 20 that overlie the T when connected thereto are shown folded back.) Section 34 has on its exposed face conductors **26*a* corresponding to conductors 26 extending the length of the cross-bar of the T and branch conductors 26*b* also corresponding to conductors 26 extending along the stem of the T and connected to the conductors 26*a* but with the conductor 26*b* crossing the near conductor 26*a* extending through insulation 36. A main line conductor strip 20 of the FIG. 2B type may then be overlaid on the cross-bar of the T with its conductors 26 in registry with conductors 26*a*, the adhesive 32 being rubbed off conductors 26 to insure electrical contact thereof with conductors 26*a*, insulation 36 preventing short circuiting across conductors 26*b*. Similarly the branch conductor strip 20** of the same type is overlaid on the stem of the T to complete the branch connection.

A branch connection with the FIG. 2A type of conductor strip can be made in similar manner. In such case, the insulation layer 30 is peeled off the main line conductor strip for a length sufficient to accommodate the cross-bar of a T-section 34. Similarly the layer 30 is peeled off the end of the branch conductor strip for a length sufficient to accommodate the stem of the T-section, and the T-section is applied with its conductor-carrying face down and its conductors **26*a* in registry with conductors 26 on the main line and conductors 26*b* in registry with conductors 26** on the branch line to effect the branch connection.

In FIG. 1 outlet O may, for example, receive plugs connected to two or more lamps in a room. It is contemplated that conductor strip 20 is also connected to one or more additional switches 18 at points of control convenience, such as near doors or beds or chairs. By virtue of the electronic switching circuitry herein utilized and hereinafter described, depression of the pushbutton of any of the switches 18 will cause the unit 10 to switch outlet O either on or off (by connections not shown in FIG. 1) and to remain in such state no matter how long that pushbutton remains depressed. The conductor strips are so thin that they are readily concealed under wallpaper or two coats of paint.

FIGS. 1 and 3 show a very simple and inexpensive surface-mountable pushbutton switch that may be safely utilized in the system according to the invention by virtue of the low voltage required to operate the electronic switching circuitry from the remote control switches. A plate 40, which may conveniently be molded of transparent or opaque moldable composition, has centrally a raised annular rim 42, which may be about one-fourth inch in height and forms the surrounding wall of a switching compartment 44.

Compartment 44 has a floor 46 provided with a slot 48 through which the end of conductor strip 20 extends and is electrically connected to two terminal screws 22 by one or more teeth of two conductive washers 24 which surround the shanks of screws 22 and are forced through the insulation of strip 20 into respective electric contact with conductors 26 of strip 20 by tightening screws 22 in threaded sockets therefor (not shown) provided in floor 46. The sockets for screws 22 are so spaced that at least one tooth of each washer 24 will overlie the conductor 26 at its side of a strip 20. Such spacing may be such, for example as to correspond to a conductor strip 20 which is about three-eighths inch wide and has conductors 26 about one-sixteenth inch wide spaced apart about one-eighth inch.

Floor 46 has apertures 50 for receiving screws 52 for fastening the switch to the wall. However, these apertures may be omitted or not utilized and the switch can be mounted on the wall (or on paint or paper covering the wall) by adhesive on the back of plate 40. Floor 46 is also provided with a pair of small apertures 54 opening into slots 56 on the underside of the floor. A U-shaped or hairpin-like spring contact member 58 has the ends of its two legs projected through apertures 54 and bent into slots 56 to anchor member 58 and to provide leverage for the spring action of its intermediate portion, which in normal position overlies in spaced relation terminal screws 22.

A pushbutton 60 of non-conductive material, which has a slightly raised central portion 62, has a diameter to fit closely but easily into the open end of rim 42 so that it rests on the outer end portion of spring contact member 58. A split retainer ring 64 may be contracted as shown in dotted lines in FIG. 3 to a diameter which fits within the open end of rim 42, the ring then expanding into a slight indentation in the rim immediately under its lip (see FIG. 1) so that ring 64 partially underlies the lip and partially overlies the edge of pushbutton 60 surrounding raised portion 62 thereof to retain the pushbutton in place in the switching compartment.

The application of pressure to pushbutton 60 forces spring contact member 58 inwardly until its sides engage the tops of terminal screws 22, thus closing the circuit through conductors 26 of conductor strip 20. On release of the pressure, the spring action of member 58 returns the pushbutton to its outward position against retainer ring 64. The underside of the pushbutton is smooth so that the outer end of member 58 can slide thereon. To remove the pushbutton, the ends of retainer ring 64 are forced together, for example, by pressing on the ring with a pointed instrument, until it is of small enough diameter to clear the lip on rim 42 and comes out. The pushbutton is then freely removable.

It will be apparent that manufacture of the switch just described involves mostly a simple molding operation to form plate 40, rim 42 with its contained switching compartment 44 and various openings in the floor 46 thereof. Assembly of spring contact member 58 to the switch compartment is a simple operation for hand or machine. If the switch is supplied with screws 22, washers 24, pushbutton 60 and ring 64 pre-assembled, these are also easy assembly operations for hand or machine. Such a simple, low-cost switch with all parts wall-external is possible within Underwriters' requirements because of the very low voltage the control circuitry of the system needs, which is too low to avoid danger of shocks to human beings or of heating sufficient to cause fire should short circuits occur.

The ease with which terminal screws 22 and their contact washers 24 may be electrically connected to the conductors of conductor strips 20 is a significant factor in the relatively low cost of installation of the system. These terminal connectors, which, so far as applicants are aware, are the first which enable adequate electric terminal connection to be made to flat, thin conductor strip such as 20 without stripping insulation, are shown in more detail in FIG. 4.

Figure 4:
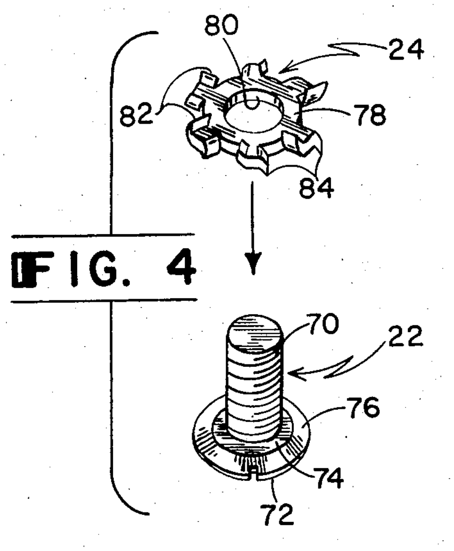
FIG. 4 is an enlarged exploded perspective view of an inverted terminal screw and its wire gripper washer used in FIGS. 1 and 3.

Referring to FIG. 4 the screws 22 have a threaded shank 70 and an enlarged head 72. The underside of head 72 has an essentially flat portion 74 immediately surrounding shank 70 which merges with a frusto-conical section 76 extending to the top of head 72. Washer 24 has an annular portion 78 which is essentially flat on both its opposite surfaces and which surrounds an aperture 80 sized to receive loosely therethrough shank 70 of a screw 22. The outer periphery of portion 78 has a plurality of integral spaced projections which have their sides beveled and bent in opposite directions, to form a first set of teeth 82 projecting away from one face of portion 78, and a second set of teeth projecting in the opposite direction away from the other face of portion 78. The width of portion 78 of the washer is slightly greater than that of flat portion 74 of the screw so that when a screw is inserted through a washer and tightened in a socket, the two flat portions 74 and 78 will come together so that portion 74 will slide on portion 78 on further turning of the screws without turning the washer which might damage the conductor strip.

The screw and washer are formed from an electro-conductive material such as conductive metal. The washers may conveniently be formed in a single stamping operation from sheet metal. By reason of the oppositely directed sets of teeth, the washers are equally operative whichever side faces away from the screw head. The teeth 82 and 84 are sufficiently sharp to bite through the insulation of a conductor strip 20 to make contact with a conductor thereof when the screws are tightened in sockets properly located with respect to the strip, as previously described.

The simple, easy to install on the surface and to conceal, control switches and wiring as described is made feasible by a combination of an electro-mechanical switch and electronic switching circuitry operated at extremely low voltage for connecting that switch momentarily only across a relatively high voltage system, such as the common household 110–120 volt A.C., to produce one only on or off actuation of the switch no matter now long the pushbutton of a control switch 18 is depressed. Momentary connection only of the electro-mechanical switch to the high voltage system (e.g., for about one-half an A.C. cycle) is vital to prevent over-heating. More than one actuation per pushbutton depression would produce undesired repetitive on-off switching.

Figure 5:
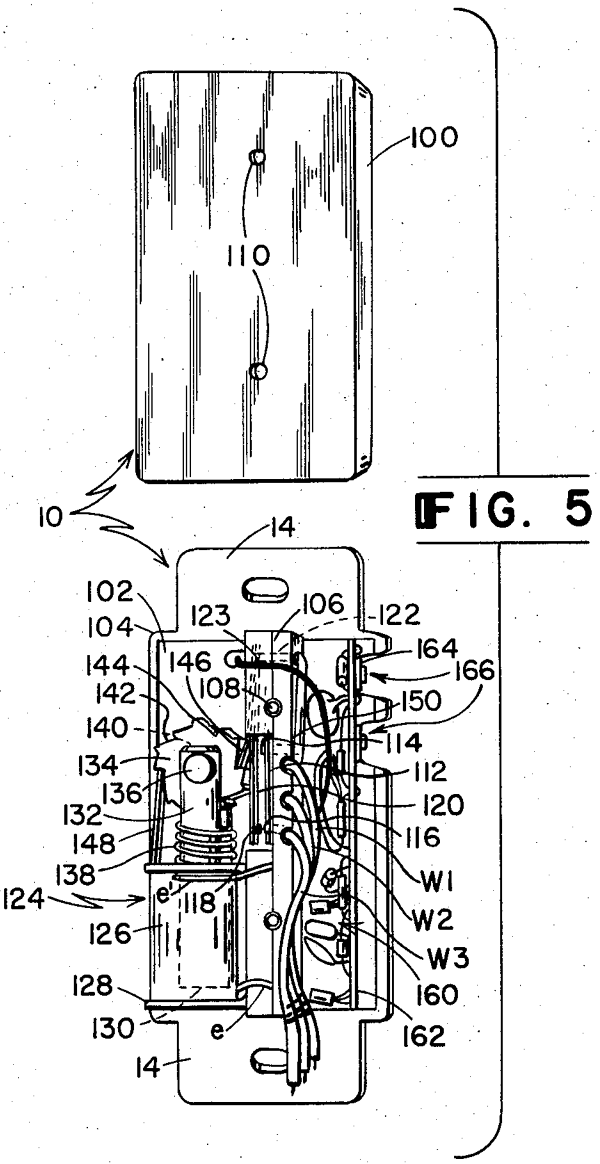
FIG. 5 is a plan view of the container of the electronic switching circuit and electro-mechanical switch with its cover separated therefrom to show the internal parts.

Electronic switching circuitry having the above criteria are disclosed in our aforesaid application and this invention utilizes a somewhat modified and improved version of the circuitry shown in FIG. 5 of that application. Aforesaid application Ser. No. 183,877 discloses electro-mechanical switches particularly adapted for use with aforesaid electronic circuitry and this invention preferably utilizes an electro-mechanical switch according to said application. The electronic switching system subsequently described herein has been successfully miniaturized, using commercially available components, so that it is entirely mounted on an insulation card eleven-sixteenths inch wide by 2½ inches long to fit edgewise within a compartment one-half inch wide by 2½ inches long by eleventh-sixteenths inch deep. The electro-mechanical switch subsequently described has been successfully produced in a size to fit and operate in a compartment three-fourths inch wide as its widest area by 2½ inches long by eleventh-sixteenths inch deep. Thus, both switch and circuitry can be mounted within a housing having a cavity about 2½ inches long, by 1½ inches wide and three-fourths inch deep with space between them for a wall of insulation about one-fourth inch thick at its thinnest point. These are the internal dimensions mentioned earlier which enable a single housing to contain both switch and circuitry and to be mounted in a conventional outlet box, e.g., at one side of a two-gang outlet box as shown in FIG. 1.

Referring now to FIG. 5, this shows the unit 10 of FIG. 1 inverted, turned end-for-end and with its cover 100 removed. Its base, which carries the end fastening lugs 14 described earlier, has a raised flat inner surface 102 preferably of the length and width of the housing cavity previously mentioned, surrounded by a depressed rim 104 on which the edge of cover 100 seats when in position. A wall 106 of insulation extends from end to end of surface 102 intermediate its sides. Wall 106 has two spaced sockets 108 in its top to receive fastening screws (not shown) which extend through matching apertures 110 in cover 100 to secure the cover in place. Wall 106, which preferably has a height of eleventh-sixteenths to three-fourths inch, has an indentation in its lefthand side as viewed in FIG. 5 in which one conductive arm 112 of a two arm switch is mounted by a pin 114 at one end which extends through wall 106 to provide a terminal end on its other side. The other end of arm 112 has a contact 116 for make-circuit engagement with and break-circuit disengagement from a contact 118 on the other conductive arm 120 of the switch (shown dotted where hidden by the perspective) which is attached to the thicker part of wall 106 beyond the identation by a pin 122 that extends through wall 106 to provide a terminal end on its other side. Arm 120 is a spring, biased to open position. An insulated wire 123 shown broken away connects live switch arm 120 to the electronic switching circuitry as will hereinafter appear.

A solenoid switch actuator designated generally 124 has its coil 126 mounted in a U-shaped bracket 128 fastened to the switch side of wall 106 at the end opposite that to which switch arm 120 is attached. The ends of this coil, *e*, *e'*, shown broken away, are connected to the electronic circuitry and to one side of the relatively high voltage circuit, as will subsequently appear. The armature 130 of switch actuator 124 has a bifurcated end extension 132 projecting through an opening (not shown) in the inner end of bracket 128 which carries a rachet 134, mounted for rotation through the slot provided in the bifurcated end extension 132 on a spindle 136 extending through said extension. A coil spring 138 surrounds extension 132, bearing at one end against bracket 128 and at the other end against an enlargement of extension 132 between its bifurcated end and bracket 128. Spring 138 urges armature 130 and extension 132 to the normal outward idle position shown against a stop 140 engaging the end of extension 132 and fixedly connected to bracket 128. When coil 126 is activated, armature 130 and its extension 132 are drawn downwardly in FIG. 5 and are returned to the position of FIG. 5 by spring 138 on deactivation of coil 126.

Ratchet 134 has on its periphery a series of alternate deep teeth 142 and shallow teeth 144. A resilient tang 146 connected to switch arm 120 is positioned to ride on the near side periphery of ratchet 134, to close switch contact 118 against switch contact 116 when positioned in a shallow tooth 144 and to separate these contacts when positioned in a deep tooth 142 as it is shown in FIG. 5. A pawl 148 fixedly connected to bracket 128 has its end arranged to engage the teeth of ratchet 134 at the opposite side of its axis from tang 146, so that when tang 146 is engaged in a deep or shallow tooth pawl 148 is correspondingly engaged in a deep or shallow tooth at the opposite side of the ratchet axis.

When ratchet 134 is drawn toward coil 130, engagement of the end of pawl 148 with the wall of the tooth in which it is seated causes rotation of ratchet 134 in the clockwise direction in FIG. 5 to move the next following tooth into engagement with tang 146, thereby opening or closing the switch contacts. Upon return of the ratchet to its idle position, engagement of tang 146 with its tooth prevents rotation of the ratchet in the opposite direction by pawl 148 as the pawl slides along the ratchet to the next tooth corresponding to the one to which tang 146 was moved. In fact, engagement of the tang with its tooth causes some further rotation of ratchet 134 in the same clockwise direction. This further turning of the ratchet on the return stroke effectively shortens the length of stroke needed to move pawl 148 to the next tooth. This is an important advantage of this switch actuator over prior devices of similar type wherein the ratchet is mounted on a fixed axis and the operating pawl must be reciprocated the full distance between teeth of the ratchet, thus reducing space required for operation and also for the coil which must be increased substantially as the length of armature movement is increased.

The use of the ratchet itself to operate the switch rather than an additional cam wheel also saves space which is important for purposes of the present invention. The ratchet is made of hard, tough insulating material such as appropriate plastic composition and the teeth thereof are spaced together as closely as possible to minimize the length of stroke of actuator 124.

An insulated wire W1 of the main high voltage circuit extends through an inclined slot 150 in wall 106 and is electrically connected to the terminal end of pin 122 of switch arm 120. An insulated wire W2 extends through a similar slot (not shown) in wall 106 and is connected to the terminal end of pin 114 of switch arm 112. Wire W2 is connected through the load to the other side of the main high voltage circuit from wire W1. Wire W3, the ground wire of the main high voltage circuit, extends through a similar slot (not shown) in wall 106 and is connectable through the electronic switching circuitry to wire W1. The grooves for the wires in wall 106 serve to anchor the wires against pull-out.

At the opposite side of wall 106 from the electromechanical switching unit just described is located the electronic switching circuitry, designated generally 160, the components of which are mounted on one face of an insulation base card 162 (see FIG. 6) preferably of the dimensions previously specified, the connections between components being generally printed circuits on the opposite face of card 152 which are not shown. Base 162 has at the end of one side a pair of L-shaped terminal members 164 secured thereto which extend through slots 166 in the side of the base of unit 10 to underlie the base, and are provided with apertures 168 (FIG. 6) for receiving therethrough terminal screws 22 (see FIG. 1) which in turn are received in apertures (not shown) in the underside of the base of unit 10. Terminal screws 22 serve the dual purposes of providing electrical connection between a conductor strip and members 164 and of securing card 162 edgewise on the base as shown in FIG. 5.

Figure 6:
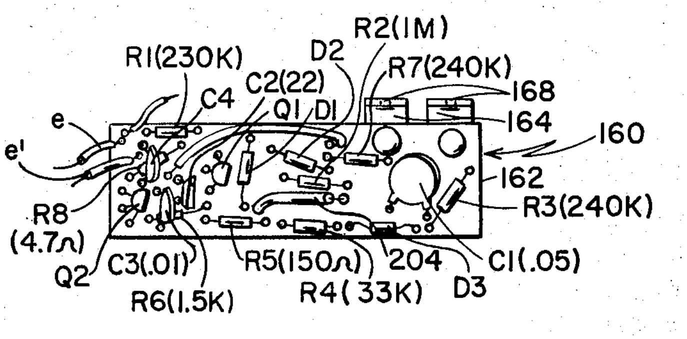
FIG. 6 is a plan view of the component carrying face of the electronic switching circuit mounting card of FIG. 5.
Figure 7:
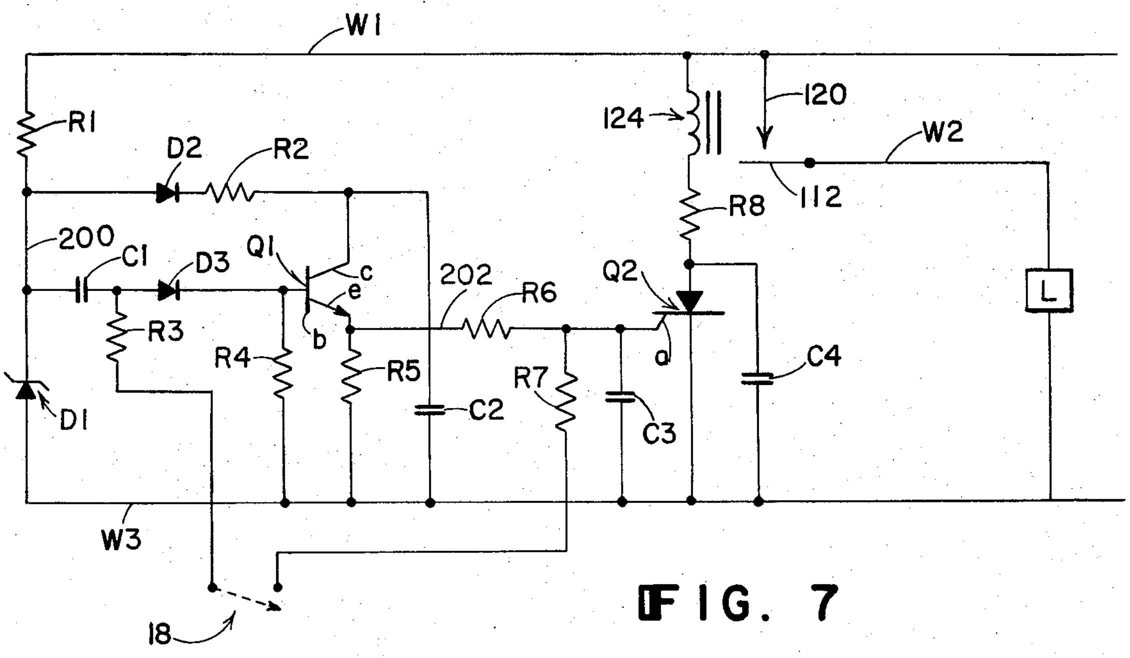
FIG. 7 is a circuit diagram of the electronic switching circuit.

FIG. 7 diagrams the electronic switching circuitry 160 of FIG. 5 while FIG. 6 shows its electronic components having the same reference designations as the corresponding diagrammed components in FIG. 7.

Referring first to FIG. 7, the two conductors of the main high voltage A.C. circuit (e.g. 110–120 V.) are wires W1 and W3 of FIG. 5. Wire W1 is the "hot" wire (positive and negative), W3, the ground wire. Electromechanical switch actuator 124 is diagrammatically shown connectable between wires W1 and W3 by electronic circuitry hereinafter described, and its controlled switch arms 120 and 112 are also diagrammatically indicated as connected respectively to wire W1 and to wire W2 of FIG. 5, which extends through the load L (outlet O in the instance shown in FIG. 1) to wire W3. A single control pushbutton switch 18 is also indicated, although more can be provided for selective operation, and it will be understood that the conductors connecting switch 18 to the electronic circuitry are the two conductors of conductor strip material 20.

The electronic circuitry comprises a Zener diode D1 connected by conductor 200 across wires W1 and W3 through a resistance R1. The characteristics of diode D1 are such that it will be conductive between wires W1 and W3 at a maximum potential of about 10 volts on the positive half cycle but is short-circuited in the opposite direction. Resistor R1 limits the current through D1. Conductor 200 is connected through diode D2 and resistor R2 to the collector *c* of a transistor Q1 and to one side of a capacitor C2 the other side of which is connected to wire W3. Conductor 200, resistor R1, diode D2, resistor R2 and capacitor C2 form a long time-constant power supply for collector *c* of transistor Q1.

Conductor 200 is also connected to one side of a capacitor C1 the other side of which is connected through resistor R3 to one terminal of switch 18 and, through diode D3, to the base *b* of transistor Q1 and to wire W3 through resistor R4. The emitter *e* of transistor Q1 is connected through resistor R5 with wire W3 and via conductor 202 and resistor R6 with the gate a of an electronic gate switch such as silicon controlled rectifier Q2. The other terminal of switch 18 is connected to conductor 202 between resistor R6 and gate a through a resistor R7, and a capacitor C3 is connected across conductor 202 and wire W3 between that connection and gate *a*. Silicon controlled rectifier Q2 is connected across wires W1 and W3 through the coil of actuator 124 and through resistor R8, and is conductive of current from wire W1 to wire W3 only when wire W1 is at positive potential and gate *a* of rectifier Q2 is at least at or above a specific positive potential. A capacitor C4 is connected in shunt between resistor R8, rectifier Q2 and wire W3.

On the positive half cycle, Zener diode D1 conducts current as limited by resistor R1 producing a square wave pulse of about +9 volts. Diode D2 passes the square wave pulse through resistor R2 charging capacitor C2. Capacitor C1 couples the square wave from diode D1 to diode D3 which is in series with the base *b* of transistor Q1. The base of Q1 is in parallel with resistor R4. Capacitor C1 also acts to differentiate the square wave, forming a spike at its leading edge. Diode D3 in series with the base of transistor Q1 may be regarded as a shunt diode rectifier circuit which charges negatively the junction of capacitor C1, resistor R3 and diode D3 and the junction of diode D3, resistor R4 and the base of transistor Q1 while switch 18 is open. This negative voltage level approximates the amplitude of the square wave at the junction of C1, R3 and D3, being somewhat less at the base of Q1.

When switch 18 is closed, the resistive shunt path to wire W3 provided through resistors R3, R7, R6 and R5 drops the negative level between capacitor C1 and base *b* of transistor Q1 sufficiently to permit the leading edge peak of the differentiated square wave to trigger conductive the base *b* of transistor Q1. When base *b* conducts, transistor Q1 discharges condenser C2 through collector *c* and emitter *e* across resistance R5, providing through conductor 202 and resistor R6 a pulse of sufficient magnitude to trigger "on" the gate *a* of rectifier Q2 so that Q2 conducts. Rectifier Q2 conducts the current from wire W1 through the coil of switch actuator 124, resistor R8 and Q2 to wire 3 causing the actuator to reciprocate once to either make or break contact between the switch arms 120 and 112. Q2 ceases to conduct when the positive level on its anode drops to zero at the end of the positive half cycle which activated Q2, so that actuator 124 receives current for only the positive half cycle of the main high voltage A.C. system.

Gate *a* of rectifier Q2 is adjusted to turn Q2 "on" only when it receives a pulse of the magnitude created when charged condenser C2 discharges through transistor Q1. This can occur only once while pushbutton switch 18 remains closed, since condenser C2 is on discharge and cannot charge through R2 and D2 at each positive half cycle, the additional pulses through transistor Q1 on subsequent such cycles being too weak to activate gate *a*.

Resistances R3 and R7, R6 and R5 limit the current through conductor strips 20 to switch 18 to a very low value, which may be less than 5 volts. Resistor R7 is also connected in series with the gate *a* of rectifier Q2 to provide a positive feed-back pulse through switch 18, resistor R3 and diode D3 (rectifier Q2 generates a positive voltage at its gate *a* when it conducts). This positive feed-back pulse holds the base *b* of transistor Q1 positive to insure its remaining conductive long enough to fully discharge capacitor C2.

Resistors R5 and R6 form a voltage divider, reducing the effects of the positive feed-back voltage at the gate *a* of rectifier Q2 when it conducts. R8 is a low wattage resistor which is used as a fuse for the anode of rectifier Q2. Condensers C3 and C4 are used to by-pass main A.C. line spikes which might otherwise accidentally activate gate *a* to turn on rectifier Q2. Resistors R3 and R4 form a voltage divider for any A.C. pickup on the conductors to switch 18.

Base *b* of transistor Q1 is rendered conductive only by the leading edge of the differentiated square wave. Consequently, if switch 18 is closed part way through a positive half cycle of the main A.C. system, actuation of transistor Q1 and rectifier Q2 will not take place until the next succeeding positive half cycle. This avoids complications which might ensue if Q1 and Q2 were activated while a positive half A.C. cycle is in progress.

FIG. 6 shows all the electric components of FIG. 7 mounted on one face of card 162 with the same reference designations followed by indications of suitable values for the resistance of the resistors and capacitance of the capacitors. (In the values on the drawing, omega is ohms, K is Kilohms, M is Megohms and the capacitance of capacitors is indicated in micro-farads). All connections between components are printed circuits (not shown) on the reverse face of card 162, except the connection of R2 to Q1 and C2 which is an unnumbered insulated conductor just above D1 and Q1 in FIG. 6.

At the top left of FIG. 6 the other end of wire 123 of FIG. 5 is shown and is connected on the back of the card to conduct from wire W1 and switch arm 120 to resistor R2 and Zenere diode D1, the other end of which is connected to broken-away wire 204 connected at its other end to wire W3. The broken away ends *e*, *e'*, of coil 126 are also shown at the top left, wire *e* being connected to wire 123 and wire *e'* to resistor R8.

In the circuitry of FIGS. 6 and 7 the value of resistor R2 is chosen such that time of the order of 1 second is required to charge capacitor C2 sufficiently to operate rectifier Q2. Multiple actuations of the electro-mechanical switch within that time are thereby prevented, which might otherwise take place by a "fluttering" pressure on the pushbutton switch and cause over-heating.

While the unit 10 has been shown and described as mounted in an ordinary wall outlet box, it of course need not be and may be mounted elsewhere as desired, for example, in a ceiling fixture escutcheon or a surface-mounted raceway system.

We claim:

1. A remote control switching system comprising:

an electro-mechanical switch alternately operable to connect a load to and disconnect it from the transmission lines of an electric supply system; and electronic switching circuitry for operatively connecting said switch including voltage reducing circuitry connectable across said transmission lines to provide a source of low voltage control current, an electronic gate switch operable from said source to operatively connect said electro-mechanical switch across said transmission lines to connect or disconnect said load, and control circuitry for operatively connecting said electronic gate switch to said source;

the components of said electronic switching circuitry being in miniature and said electronic switching circuitry and said electro-mechanical switch being mounted together within a single housing of insulation having internal dimensions, varying within manufacturing tolerances, of 2½ inches long by 1½ inches wide by three-fourths inch deep.

2. A switching system according to claim 1 wherein said electronic switching circuitry and said electro-mechanical switch have a barrier of insulation between them.

3. A switching system according to claim 1 which also comprises means for operating said control circuitry including at least one wall-surface mountable switch and wall-surface mountable conductors connectable to the terminals of said wall-surface mountable switch and to said control circuitry for operatively connecting said control circuitry to said electronic gate switch on closing of the circuit through said conductors by operation of a said wall-surface mountable switch connected thereto.

4. A switching system according to claim 3 wherein the potential across said conductors when connected to said control circuitry is less than 5 volts.

5. A switching system according to claim 3 wherein said conductors are thin, flat conductive strips having thin flat insulation on at least one face thereof, said insulation carrying adhesive for attaching the conductive strips and insulation to a surface, said conductive strips and insulation being sufficiently thin to be concealed by wallpaper or paint when mounted on a wall surface.

6. A switching system according to claim 3 wherein each said wall-surface mountable switch is a pushbutton switch.

7. A switching system according to claim 3 which includes more than one said wall-surface mountable switch.

8. A switching system according to claim 3 wherein said control circuitry is operable by closing the circuit through said conductors connected thereto to cause said electronic gate switch to connect said electro-mechanical switch across said transmission lines for a time interval sufficient to effect only one actuation of said electro-mechanical switch and thereupon to cause said electronic gate switch to operatively disconnect said electro-mechanical switch from said transmission lines until the circuit through said conductors has been opened and again closed.

9. A switching system according to claim 8 wherein said time interval is during only half an A.C. cycle.

10. A switching system according to claim 1 wherein said electro-mechanical switch is a ratchet type solenoid switch, the coil of said solenoid being connectable by said electronic gate switch across said transmission lines.

11. A switching system according to claim 1 wherein said electronic gate switch is a rectifier having a gate which renders the switch conductive during only half an A.C. cycle when a pulse of predetermined magnitude is applied thereto, and said control circuitry includes pulsing means operative to apply only one pulse of said magnitude to said gate over an electric connection thereto while said voltage reducing circuitry is connected across said transmission lines.

12. A switching system according to claim 11 which includes a capacitor connected to one of said transmission lines and to the electrical connection between said electro-mechanical switch and said electronic gate switch.

13. A switching system according to claim 11 wherein said pulsing means includes a capacitor which is connected to said voltage reducing circuitry for charging only while said voltage reducing circuitry remains disconnected from said transmission lines and which is discharged by said pulsing means when said voltage reducing circuitry is connected to said transmission lines to provide said only one pulse.

14. A switching system according to claim 13 wherein said pulsing means includes a transistor connected between said capacitor and said gate for conducting the charge from said capacitor to said gate.

15. A switching system according to claim 14 which includes a feed-back circuit from said gate to the base of said transistor.

16. A switching system according to claim 14 which includes a capacitor connected to the electric connection between said transistor and said gate and to the transmission line to which said electronic gate switch conducts.

17. A switching system according to claim 14 wherein said transistor is connected to said gate through a voltage divider.

18. A switching system according to claim 3 wherein a said wall-surface mountable switch comprises a plate having a raised rim centrally of a surface thereof defining the side wall of a switching compartment having a floor, a slot in said floor for receiving the ends of a pair of conductors, a pair of terminal screws in said floor for respective electric engagement with said conductors, a U-shaped electro-conductive spring, apertures in said floor for receiving and retaining the opposite ends of said spring with the intermediate portion thereof overlying said terminal screws, a pushbutton insertable loosely in said compartment to rest on said spring so that depression of said pushbutton presses said spring into electrical conducting contact with said terminal screws, and a split ring insertable in said compartment over said pushbutton to retain the pushbutton in said compartment by expansion of said ring against said side wall.

19. A switching system according to claim 5 including terminals for making electrical connections between said conductors and other components of said system, said terminals comprising screws of electro-conductive material for insertion in sockets provided in said components, and washers of electro-conductive material having a central aperture for receiving therethrough the threaded shank of a said screw, said washers having two peripheral sets of teeth oppositely directed along the longitudinal axis of the washer, said teeth being sufficiently sharp to penetrate said insulation to make electrical contact with a said conductor when said washer is pressed on a said strip by the head of a said screw extending through the aperture therein and screwed into a said socket.

20. A switching system according to claim 19 wherein the teeth of said two sets are respectively oppositely bent sides of serrations in the periphery of said washers.

* * * * *